United States Patent [19]

Baumers et al.

[11] Patent Number: 4,638,877
[45] Date of Patent: Jan. 27, 1987

[54] STEERING AXLE ARRANGEMENT FOR A WHEEL BODY OF A VEHICLE

[75] Inventors: Hans Baumers, Dusseldorf; Heinz Lietzke, Neuss; Winfred Schulte, Ratigen, all of Fed. Rep. of Germany

[73] Assignee: Losenhausen Maschinenbau AG & Co. Kommanditgesellschaft, Fed. Rep. of Germany

[21] Appl. No.: 588,003

[22] Filed: Mar. 9, 1984

[30] Foreign Application Priority Data

Apr. 2, 1983 [DE] Fed. Rep. of Germany ....... 3312175

[51] Int. Cl.$^4$ .......................... B62D 61/00; B62D 5/02
[52] U.S. Cl. .................................... 180/21; 180/79.4; 180/144
[58] Field of Search ................. 180/21, 144, 237, 238, 180/145, 150, 162, 79.4

[56] References Cited

U.S. PATENT DOCUMENTS 3,061,031 10/1962 Packard ................................. 180/21

FOREIGN PATENT DOCUMENTS 651355 1/1934 Fed. Rep. of Germany .
3012003 11/1980 Fed. Rep. of Germany .

Primary Examiner—Henry Bennett
Attorney, Agent, or Firm—Laney, Dougherty, Hessin, Claro & Beavers

[57] ABSTRACT

A vertical steering axle rigidly connected with a steering frame of a roller vehicle, for example of a vibratory tandem roller, is rotatably and axially slidingly mounted in a guide bushing pendulously connected to a vehicle frame. An elastomeric element between the vehicle frame and the steering axle is arranged coaxially to the steering axle above an upper end face thereof and, on one side, is non-rotatably connected with this upper end face.

8 Claims, 1 Drawing Figure

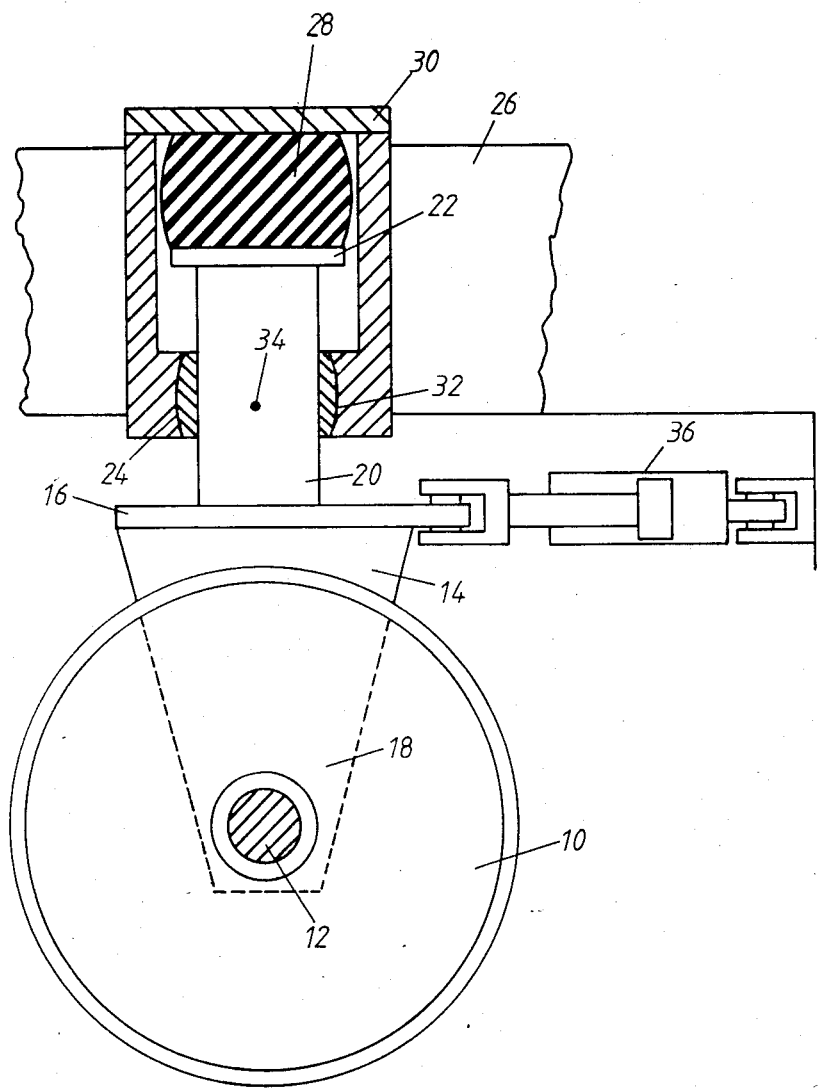

STEERING AXLE ARRANGEMENT FOR A WHEEL BODY OF A VEHICLE

BACKGROUND OF THE INVENTION

1. Field of the Invention

The invention relates to a steering axle assembly for a wheel body of a vehicle, which has a vehicle frame. The wheel body may, for example, be a roller drum of a vibratory tandem roller of a steerable steering wheel.

2. Description of the Prior Art

German Patent Document 30 12 003 discloses a road roller having two roller drums provided on a vehicle frame, one of said roller drums being a steerable steering drum. The steering drum is mounted in a steering frame. A vehicle steering axle is rigidly connected with the steering frame. Anti-friction bearing means are provided for the steering axle. Rubber elements are arranged as support elements between the vehicle frame and the steering axle. In German Patent Document No. 30 12 003, the bearing means for the steering axle are attached to a bridge element, which is connected to the vehicle frame through two longitudinally spaced rubber elements. These rubber elements permit tilting of the steering drum relative to the vehicle frame and absorb impacts which occur, when the road roller hits on obstacles. There the steering axle is non-displaceably retained in axial direction relative to the bridge element and the bearing.

With this assembly, the steering roller is connected with the vehicle frame through the rubber elements only. This is a rather unstable design.

With these and similar vibratory tandem rollers, the steering movement is usually effected by means of a hydraulically actuated jack, which is arranged between the vehicle frame and the steering frame. In many cases, the hydraulic jack is a double-acting cylinder having two opposite directions of operation.

German Pat. No. 651 355 discloses a road roller, the steering drum body of which consists of two spaced drums arranged side by side. These drums of the steering drum body are rotatably mounted on separate stub axles provided with vertical pivot pins. The pivot pins are rotatable by means of a common steering axle and are vertically displaceable against the action of springs. The springs are helical springs which surround the pivot pins.

This is a complex special construction which is susceptible to failure.

SUMMARY OF THE INVENTION

The present invention provides a steering axle assembly for a wheel body of a vehicle having a vehicle frame. The steering axle assembly includes a steering frame in which the wheel body is mounted, a steering axle rigidly connected with the steering frame, bearing means for the steering frame, and an elastomeric supporting element between the vehicle frame and the steering axle. The bearing means comprises a guide bushing which is connected with the vehicle frame and in which the steering axle is axially slidingly guided. The elastomeric supporting element is arranged coaxially with respect to the steering axle. One side of the elastomeric supporting element is non-rotatably connected with the steering axle.

It is, therefore, a general object of the invention to provide an improved, simple and rugged steering axle assembly.

BRIEF DESCRIPTION OF THE DRAWING

The drawing is a vertical sectional view through a steering axle assembly.

DETAILED DESCRIPTION OF THE PREFERRED EMBODIMENT

A guiding or steering drum 10 of a vibratory tandem roller is mounted on an axle 12 in a steering frame 14. The steering frame 14 has an inverted U-shaped cross section with a horizontal plate 16 extending, on the top, across the steering drum 10, and side plates 18 extending downward therefrom at the ends thereof. The steering drum 10 is mounted between the side plates.

A steering axle 20 extending vertically upwards is centrally affixed to the plate 16. The steering axle 20 is rigidly connected with the upper plate 16 of the steering frame 14. At its upper end face, the steering axle 20 includes a flange 22 which is rigidly attached to the lower cylindrical portion of the steering axle 20.

Bearing means for the steering axle 20 comprise a guide bushing 24, which is connected with a vehicle frame 26 through a housing 30 described below. The steering axle 20 is slidingly guided within the cylindrical inner surface of this guide bushing 24.

An elastomeric supporting element 28, preferably made of rubber, is arranged coaxially to the steering axle 20, and serves as a support element between vehicle frame 26 and steering axle 20. On its lower side, the elastomeric supporting element 28 is non-rotatably connected with the steering axle 20. In the illustrated preferred embodiment, the elastomeric supporting element 28 is located in front of, i.e., above, the upper end face of the steering axle 20 and is connected to the flange 22.

The guide bushing 24 is arranged in a first end face of a cylindrical (or otherwise prismatic) housing 30. The housing 30 is rigidly attached to the vehicle frame 26. The steering axle 20, which is guided and rotatably mounted in the guide bushing 24, extends into this housing 30. The elastomeric supporting element 28 is arranged in the housing 30 between the end face of the steering axle 20 and a second upper end face of the housing 30.

In the preferred embodiment illustrated, the guide bushing 24 is mounted on the vehicle frame 26, or on the housing 30 connected thereto, in a manner permitting pendulous motion; that is, the steering axle 20, steering frame 14 and wheel body 12 can swing like a pendulum relative to vehicle frame 26. This is achieved in that the guide bushing 24 is mounted with a barrel-shaped outer surface 32 rotatably received in a vehicle frame-fixed bearing surface complementary thereto. This vehicle frame-fixed bearing surface is defined in the first end face of housing 30, and is shown in profile in the drawing as two curvilinear concave lines coincident with surface 32. In this way, the elastomeric supporting element 28, by shearing action, resiliently and dampingly absorbs the pendulous motion of the steering axle 20 about the pivotal point of the guide bushing 24. With axial compressive forces on the steering axle 20, the single elastomeric supporting element 28 is subjected to compression. It permits the steering motion by torsion and permits pendulous motion by shearing stress.

The stress on the guide bushing 24 can be kept small when the mass distribution of the wheel body, i.e., here of the steering drum 10, of the vehicle frame 26 and of the steering axle 20 (with the steering frame 14) is so designed that the impact axis, associated with the axle 12 of the wheel body, of this rigid assembly passes through a point 34 located substantially within the guide bushing 24 of the steering axle. Then an impact transmitted through the axle 12 does not cause radial stress on the guide bushing 24.

The steering motion is imparted by a hydraulic jack 36, which is a double-acting cylinder with two opposite directions of operation, and which is arranged between the vehicle frame 26 and the steering frame 14 and engages the steering frame 14 laterally of the steering axle 20.

Thus it is seen that the apparatus and methods of the present invention readily achieve the ends and advantages mentioned as well as those inherent therein. While certain preferred embodiments of the present invention have been illustrated for the purposes of the present disclosure, numerous changes in the arrangement and construction of parts and steps may be made by those skilled in the art, which changes are encompassed within the scope and spirit of the present invention as defined by the appended claims.

What is claimed is:

1. In a steering axle assembly for a wheel body of a vehicle which has a vehicle frame, said steering axle assembly including:
   (a) a steering frame in which the wheel body is mounted;
   (b) a steering axle rigidly connected with a steering frame;
   (c) bearing means for the steering axle; and
   (d) an elastomeric supporting element between the vehicle frame and the steering axle; the improvement which comprises:
   (e) said bearing means comprising a guide bushing which is connected with the vehicle frame and in which the steering axle is axially slidingly guided, said guide bushing being supported on the vehicle frame in a manner permitting pendulous motion of the steering axle, steering frame and wheel body relative to the vehicle frame;
   (f) said elastomeric supporting element being arranged coaxially with respect to the steering axle; and
   (g) said elastomeric supporting element, on one side, being non-rotatably connected with the steering axle.

2. In a steering axle assembly for a wheel body of a vehicle which has a vehicle frame, said steering axle assembly including:
   (a) a steering frame in which the wheel body is mounted;
   (b) a steering axle rigidly connected with the steering frame;
   (c) bearing means for the steering axle; and
   (d) an elastomeric supporting element between the vehicle frame and the steering axle; the improvement which comprises:
   (e) said bearing means comprising a guide bushing which is connected with the vehicle frame and in which the steering axle is axially slidingly guided;
   (f) said elastomeric supporting element being arranged coaxially with respect to the steering axle; and
   (g) said elastomeric supporting element, on one side, being non-rotatably connected with the steering axle;
   (h) wherein a mass distribution of a rigid assembly including the wheel body is such that an impact axis associated with an axis of the wheel body of this rigid assembly passes through a point located substantially within the guide bushing of the steering axle.

3. In a steering axle assembly for a steering drum in a vibratory tandem roller which has a vehicle frame including:
   (a) a steering frame in which the steering drum is mounted;
   (b) a steering axle rigidly connected with the steering frame and having an end face;
   (c) bearing means for the steering axle; and
   (d) an elastomeric supporting element between the vehicle frame and the steering axle; the improvement which comprises:
   (e) a housing being attached to the vehicle frame and having an upper and a lower end face;
   (f) said bearing means comprising a guide bushing provided in said lower end face;
   (g) said steering axle being rotatably and longitudinally movably mounted in said guide bushing and extending into said housing;
   (h) said guide bushing being supported in said lower end face in a manner permitting pendulous motion of the steering axle, steering frame and steering drum relative to the vehicle frame;
   (i) said elastomeric supporting element being arranged in the housing between the end face of the steering axle and the upper end face of the housing; and
   (j) said elastomeric supporting element, on one side, being non-rotatably connected with said end face of the steering axle.

4. The steering axle assembly of claim 1, wherein the elastomeric supporting element is located in front of an end face of the steering axle.

5. The steering axle assembly of claim 4, wherein:
   (a) the guide bushing is arranged in a first end face of a housing;
   (b) the housing is rigidly affixed to the vehicle frame;
   (c) the steering axle is rotatably mounted in the guide bushing and extends into the housing; and
   (d) the elastomeric supporting element is arranged in the housing between the end face of the steering axle and a second end face of the housing.

6. The steering axle assembly of claim 1, wherein the guide bushing has a barrel-shaped outer surface which is received in a vehicle frame-fixed bearing surface complementary thereto, thereby providing a means for permitting said pendulous motion.

7. The steering axle assembly of claim 6, wherein a mass distribution of a rigid assembly including the wheel body is such that an impact axis associated with an axis of the wheel body of this rigid assembly passes through a point located substantially within the guide bushing of the steering axle.

8. The steering axle assembly of claim 1, wherein a mass distribution of a rigid assembly including the wheel body is such that an impact axis associated with an axis of the wheel body of this rigid assembly passes through a point located substantially within the guide bushing of the steering axle.

* * * * *